United States Patent
Sheedy et al.

(10) Patent No.: US 12,071,378 B2
(45) Date of Patent: Aug. 27, 2024

(54) HIGH TEMPERATURE FIBER AND METHOD OF MAKING

(71) Applicant: RTX Corporation, Farmington, CT (US)

(72) Inventors: Paul Sheedy, Bolton, CT (US); Wayde R. Schmidt, Pomfret Center, CT (US); Neal Magdefrau, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 1240 days.

(21) Appl. No.: 16/536,742

(22) Filed: Aug. 9, 2019

(65) Prior Publication Data

US 2021/0039998 A1 Feb. 11, 2021

(51) Int. Cl.
| | |
|---|---|
| *C04B 35/628* | (2006.01) |
| *C04B 35/622* | (2006.01) |
| *C04B 35/80* | (2006.01) |
| *D01F 11/10* | (2006.01) |
| *D06M 11/83* | (2006.01) |

(52) U.S. Cl.
CPC .... *C04B 35/6286* (2013.01); *C04B 35/62231* (2013.01); *C04B 35/62272* (2013.01); *C04B 35/62884* (2013.01); *C04B 35/80* (2013.01); *D06M 11/83* (2013.01); *C04B 2235/5212* (2013.01); *C04B 2235/522* (2013.01); *C04B 2235/5224* (2013.01); *C04B 2235/5228* (2013.01); *C04B 2235/5236* (2013.01); *C04B 2235/524* (2013.01); *C04B 2235/5244* (2013.01); *C04B 2235/5248* (2013.01); *C04B 2235/9669* (2013.01); *D01F 11/10* (2013.01)

(58) Field of Classification Search
None
See application file for complete search history.

(56) References Cited

U.S. PATENT DOCUMENTS

| | | | |
|---|---|---|---|
| 4,942,011 A | 7/1990 | Bolt et al. | |
| 5,204,380 A * | 4/1993 | Seyferth | C04B 35/571 |
| | | | 528/25 |
| 5,558,907 A | 9/1996 | Steffier | |
| 5,783,139 A | 7/1998 | Curran | |
| 6,299,988 B1 | 10/2001 | Wang et al. | |
| 6,322,889 B1 * | 11/2001 | Lara-Curzio | C04B 35/565 |
| | | | 428/389 |
| 6,979,490 B2 | 12/2005 | Steffier | |
| 8,617,652 B2 | 12/2013 | Lee | |
| 8,906,814 B2 * | 12/2014 | Lee | D06M 11/36 |
| | | | 428/221 |
| 9,376,750 B2 | 6/2016 | George et al. | |
| 9,834,849 B2 | 12/2017 | Sammelselg et al. | |
| 10,092,927 B2 | 10/2018 | George et al. | |
| 2004/0138046 A1 | 7/2004 | Sherwood, Jr. et al. | |
| 2005/0181192 A1 * | 8/2005 | Steffier | B32B 18/00 |
| | | | 428/293.4 |
| 2008/0119098 A1 | 5/2008 | Palley et al. | |
| 2009/0137043 A1 | 5/2009 | Parsons et al. | |
| 2010/0130082 A1 * | 5/2010 | Lee | D06M 11/78 |
| | | | 428/221 |
| 2010/0260998 A1 * | 10/2010 | Waicukauski | C03C 25/47 |
| | | | 977/773 |
| 2011/0155062 A1 | 6/2011 | Kato et al. | |
| 2012/0040581 A1 | 2/2012 | Kim | |
| 2013/0025458 A1 | 1/2013 | Li et al. | |
| 2015/0291473 A1 | 10/2015 | Schmidt | |
| 2016/0159694 A1 | 6/2016 | Chamberlain et al. | |
| 2016/0265143 A1 * | 9/2016 | Garnier | C04B 35/62277 |
| 2016/0326672 A1 | 11/2016 | Higuchi et al. | |
| 2017/0141383 A1 | 5/2017 | Dadheech et al. | |
| 2017/0190629 A1 | 7/2017 | Lakrout et al. | |
| 2017/0327948 A1 | 11/2017 | Dadheech et al. | |
| 2017/0342844 A1 | 11/2017 | Schmidt et al. | |
| 2018/0327327 A1 | 11/2018 | Suyama et al. | |
| 2019/0322595 A1 | 10/2019 | Magdefrau et al. | |
| 2021/0039999 A1 | 2/2021 | Sheedy et al. | |
| 2021/0040651 A1 | 2/2021 | Sheedy et al. | |
| 2021/0075016 A1 | 3/2021 | Choi et al. | |
| 2023/0304194 A1 | 9/2023 | Sheedy et al. | |

FOREIGN PATENT DOCUMENTS

| | | |
|---|---|---|
| CN | 104213099 A | 12/2014 |
| EP | 3556740 A1 | 10/2019 |
| GB | 2467928 A | 8/2010 |
| KR | 101855718 B1 | 5/2018 |
| WO | 2013142344 A1 | 9/2013 |

OTHER PUBLICATIONS

Extended European Search Report for European Application No. 20188050.7; Application Filing Date: Jul. 28, 2020; dated Nov. 5, 2020; 7 pages.

Militzer et al., "Deposition of an organic-inorganic hybrid material onto carbon fibers via the introduction of furfuryl alcohol into the atomic layer deposition process of titania and subsequent pyrolysis", Journal of Vacuum Science and Technology: Part A, AVS/AIP, vol. 35, No. 1, Nov. 9, 2016, 13 pages.

European Extended Seach Report for European Application No. 20188054.9; Application Filing Date: Jul. 28, 2020; dated Dec. 10, 2020; 9 pages.

Putkonen, et al., "Atomic layer deposition of Ti—Nb—O thin films onto electrospun fibers for fibrous and tubular catalyst support structures", J. Vac. Sci. Technol. A 36(1), Jan./Feb. 2018, 7 pages.

(Continued)

*Primary Examiner* — John J Figueroa
(74) *Attorney, Agent, or Firm* — CANTOR COLBURN LLP

(57) ABSTRACT

Disclosed is a method of making high temperature fiber including incorporating an inorganic atom into a polymer precursor fiber to form a modified polymer precursor fiber and converting the modified polymer precursor fiber to a high temperature fiber having a bonded inorganic atom.

8 Claims, No Drawings

(56) References Cited

OTHER PUBLICATIONS

European Office Action for EP Application No. 20188050.7, dated Feb. 23, 2023, pp. 1-5.
Final Office Action issued in U.S. Appl. No. 16/536,725 dated Mar. 31, 2023, pp. 1-7.
Bernardo et al., Advanced Ceramics from Preceramic Polymers Modified at the Nano-Scale: A Review, Materials, 2014, 30 pages.
U.S. Notice of Allowance for U.S. Appl. No. 16/536,688 dated Aug. 30, 2022, pp. 1-12.
Extended European Search Report issued in Application No. 20190288.9 dated Dec. 10, 2020, 12 pages.
Final Office Action issued in U.S. Appl. No. 16/536,725 dated Jun. 22, 2022, 8 pages.
Kayaci, Fatma et al., "Polymer-Inorganic Core-Shell Nanofibers by Electrospinning and Atomic Layer Desposition: Flexible Nylon ZnO Core-Shell Nanofiber Mats and Their Photocatalytic Activity", ACS Publications, Apl. Materials & Interfaces, 2012, pp. 6185-6194.
Non-Final Office Action issued in U.S. Appl. No. 16/536,725 dated Feb. 24, 2022, 29 pages.
Notice of Allowance issued in U.S. Appl. No. 16/536,688 dated Apr. 19, 2022, 9 pages.
Raj N. Singh, "High-Temperature Mechanical Preperties of a Uniaxially Reinforced Zircon-Silicon Carbide Composite", Journal of the American Ceramic Society, vol. 73, No. 8, Aug. 1990, pp. 2399-2406.
Restriction Requirement issued in U.S. Appl. No. 16/536,725 dated Nov. 26, 2021, 5 pages.
Restriction Requirement issued in U.S. Appl. No. 16/536,688 dated Jun. 16, 2021, 7 pages.
U.S. NonFinal Office Action; U.S. Appl. No. 16/536,688; dated Nov. 8, 2021; 23 Pages.
Non Final Office Action for U.S. Appl. No. 18/083,817; dated Mar. 18, 2024; 7 pages.

\* cited by examiner

HIGH TEMPERATURE FIBER AND METHOD OF MAKING

BACKGROUND

Exemplary embodiments pertain to the art of high temperature fibers.

Composite components are finding increased use in aerospace applications due to their unique, tailorable properties which can result in significant weight savings, increased performance and durability, as well as reductions in specific fuel consumption. In particular, gas turbine engines, such as aircraft engines, operate in severe environments and show significant benefit from incorporation of composite materials. Additionally, other aerospace components, such as aircraft brakes and friction materials, can benefit from incorporating composite materials.

As an example, ceramic matrix composite (CMC) components have desirable high temperature mechanical, physical, and chemical properties which allow gas turbine engines to operate at much higher temperatures with significant weight savings as compared to current engines with superalloy components. Ceramic matrix composites include fibers embedded in a ceramic matrix. There is an ongoing need for fibers with increased oxidation resistance and temperature resistance.

BRIEF DESCRIPTION

Disclosed is a method of making high temperature fiber including incorporating an inorganic species into a polymer precursor fiber to form a modified polymer precursor fiber and converting the modified polymer precursor fiber to a high temperature fiber having a bonded inorganic atom.

In addition to one or more of the features described above, or as an alternative to any of the foregoing embodiments, the bonded inorganic atom is bound to nitrogen, oxygen, silicon, boron, or carbon.

In addition to one or more of the features described above, or as an alternative to any of the foregoing embodiments, the bonded inorganic atom includes aluminum, a refractory metal, a lanthanide, silicon, boron, yttrium, or a combination thereof.

In addition to one or more of the features described above, or as an alternative to any of the foregoing embodiments, the bonded inorganic atom includes a refractory metal bound to carbon.

In addition to one or more of the features described above, or as an alternative to any of the foregoing embodiments, the polymer precursor fiber includes acrylic polymers, cellulosic polymers, phenolic polymers, polyolefins, polyacetylene, polyacrylonitrile, polyphenylene, polyvinylidene chloride, copolymers and terpolymers thereof, polyaromatic hydrocarbon polymers, and combinations of the foregoing.

In addition to one or more of the features described above, or as an alternative to any of the foregoing embodiments, the polymer precursor fiber includes polycarbosilanes, polysilazanes, polysilanes, polycarbosiloxanes, organo-silsesquioxane-containing polymers, sol-gel derived polymers, polysiloxanes, polyborosilazanes, polyaluminosilazanes, any of the foregoing including a metal, and combinations thereof.

In addition to one or more of the features described above, or as an alternative to any of the foregoing embodiments, the polymer precursor fiber includes ceramic particles.

In addition to one or more of the features described above, or as an alternative to any of the foregoing embodiments, the inorganic species is incorporated into the polymer precursor fiber by atomic layer deposition (ALD), molecular layer deposition (MLD), sequential vapor infiltration (SVI) or a combination thereof.

In addition to one or more of the features described above, or as an alternative to any of the foregoing embodiments, the polymer precursor fiber includes an existing inorganic atom. In the high temperature fiber the bonded inorganic atom may be the same as or different from the existing inorganic atom.

Also disclosed herein is a high temperature fiber including a core composition and a peripheral composition wherein the peripheral composition differs from the core composition and the peripheral composition includes a bonded inorganic atom.

In addition to one or more of the features described above, or as an alternative to any of the foregoing embodiments, the high temperature fiber includes a ceramic fiber, carbon fiber, fibers containing silicon, fibers containing boron, or a fiber containing any combination of silicon, carbon and/or boron.

In addition to one or more of the features described above, or as an alternative to any of the foregoing embodiments, the high temperature fiber includes carbon, SiC, SiBCN, SiNC, $B_4C$, SiOC, SiAlCN, aluminum oxide, zirconium oxide, yttrium oxide, titanium dioxide, zirconium carbide, zirconium nitride, boron nitride, silicon nitride, aluminosilicate, silicon dioxide, E-glass, S-glass, and combinations thereof.

In addition to one or more of the features described above, or as an alternative to any of the foregoing embodiments, the bonded inorganic atom is a refractory metal atom bound to a carbon atom.

In addition to one or more of the features described above, or as an alternative to any of the foregoing embodiments, the bonded inorganic atom is bound to nitrogen, oxygen, silicon, boron or carbon.

Also disclosed herein is a composite having a high temperature fiber embedded in a matrix wherein the high temperature fiber includes a core composition and a peripheral composition wherein the peripheral composition differs from the core composition and the peripheral composition includes a bonded inorganic atom.

In addition to one or more of the features described above, or as an alternative to any of the foregoing embodiments, the high temperature fiber includes a ceramic fiber, carbon fiber, fibers containing silicon, fibers containing boron, or a fiber containing any combination of silicon, carbon and/or boron.

In addition to one or more of the features described above, or as an alternative to any of the foregoing embodiments, the bonded inorganic atom is a refractory metal atom bound to a carbon atom.

In addition to one or more of the features described above, or as an alternative to any of the foregoing embodiments, the bonded inorganic atom is bound to nitrogen, oxygen, silicon, boron or carbon.

DETAILED DESCRIPTION

A detailed description of one or more embodiments of the disclosed apparatus and method are presented herein by way of exemplification and not limitation with reference to the Figures.

A high temperature fiber, as used herein, refers to a fiber which maintains shape and integrity at temperatures greater than or equal to 800° C. High temperature fibers can be used in composites having a variety of matrices such as polymer, metal, glass, glass/ceramic, ceramic or a combination thereof.

An inorganic atom, as used herein, refers to any atom except carbon. A bonded inorganic atom refers to an inorganic atom that is bonded to other atom(s) that form the high temperature fiber. The bonded inorganic atom is bonded to as many other atoms as permitted by its valency and oxidation state.

Composites exhibit a significant amount of damage tolerance when under an applied load. In ceramic matrix composites (CMC) in particular, this damage tolerance is predominantly due to the formation of multiple matrix cracks that aid in the redistribution of stresses. However, the formation of matrix cracks can result in environmental exposure to the fiber which can result in fiber oxidation. High temperature fibers having a bonded inorganic atom, when exposed to high temperatures, may have greater resistance to oxidation because the inorganic atom may oxidize and form a protective oxide.

Described herein is a method of making high temperature fibers. The method includes incorporating an inorganic species into a polymer precursor fiber to form a modified polymer precursor fiber and converting the modified polymer precursor fiber to the high temperature fiber having a bonded inorganic atom.

Exemplary polymer precursor fibers are fibers formed of polymers, optionally in combination with ceramic particles. The polymer precursor fibers can be converted, typically through pyrolyzing or other thermal or radiation treatment, to a high temperature fiber such as a ceramic fiber, carbon fiber, fiber containing silicon, fiber containing boron, fiber containing nitrogen, fiber containing oxygen, and fiber containing any combination of silicon, carbon, nitrogen, oxygen and/or boron. Exemplary polymers for forming carbon fibers include acrylic polymers, cellulosic polymers, phenolic polymers, polyolefins, polyacetylene, polyacrylonitrile, polyphenylene, polyvinylidene chloride, copolymers and terpolymers thereof polyaromatic hydrocarbon polymer (mesophase pitch), and combinations of the foregoing. Exemplary polymers for forming fibers containing silicon include polycarbosilanes, polysilazanes, polysilanes, polycarbosiloxanes, organo-silsesquioxane-containing polymers, sol-gel derived polymers, polysiloxanes, polyborosilazanes, polyaluminosilazanes, any of the foregoing including a metal such as aluminum, zirconium, titanium, boron, hafnium and the like, and combinations thereof. Fiber precursors to SiBCN, SiNC, $B_4C$, SiOC, $Si_3N_4$, BN and SiAlCN fibers can also be used. The polymer precursor fiber may comprise ceramic particles such as oxides, carbides, nitrides, borides, glasses and combinations thereof. The polymer precursor fiber may be (partially or fully) cross linked, cured, or densified but requires pyrolysis or other thermal or radiation treatment under controlled atmosphere to convert to a high temperature fiber.

The polymer precursor fiber may comprise an inorganic atom. The methods described herein provide ways to supplement the existing inorganic atoms with additional inorganic atoms which may be chemically the same or different from the existing inorganic atoms. For example, a SiBCN fiber may be modified with either more B or Al or both.

The inorganic species is incorporated into the polymer precursor fiber by atomic layer deposition (ALD), molecular layer deposition (MLD), sequential vapor infiltration (SVI) or a combination thereof "Incorporated" includes chemical bonding and/or infiltration into the volume of the polymer precursor fiber. Chemical bonding includes all types of chemical bonding, for example, covalent and ionic. The inorganic species includes an inorganic atom and at least one leaving group (or reactive functional group). Exemplary inorganic species include metal containing species such as organometallic compounds and inorganic compounds. The term "sequential vapor infiltration" includes variants such as multiple pulse infiltration and sequential infiltration synthesis. Sequential vapor infiltration diffuses reactants into the precursor fiber and incorporates the inorganic species below the surface of the polymer precursor fiber. Incorporated inorganic species result in bonded inorganic atoms following conversion steps to form the high temperature fiber. Atomic layer deposition and molecular layer deposition bond the inorganic species at the surface of the polymer precursor fiber and may build up the fiber surface with multiple cycles. SVI, ALD and/or MLD may be combined to result in the desired distribution of inorganic species and final high temperature fiber diameter.

Incorporating the inorganic species into the polymer precursor fiber may result in a doped structure (i.e., present in an amount below levels which form a second phase), a multi-phase structure, a highly disordered structure, an amorphous structure, or a layered structure (when inorganic atoms are present primarily at or near the surface) upon conversion to the high temperature fiber. The inorganic species may also bond to more than one polymer chain in the polymer precursor fiber, thus acting as a cross linker and further stabilizing the polymer precursor fiber.

Exemplary inorganic atoms present in the inorganic species include aluminum, refractory metals, lanthanides, boron, silicon, yttrium, and combinations thereof. Exemplary refractory metals include titanium, zirconium, hafnium, vanadium, niobium, tantalum, chromium, molybdenum, tungsten, manganese, technetium, rhenium, ruthenium, osmium, rhodium, and iridium.

The inorganic atom may be bonded to a nitrogen, oxygen, silicon, boron, or carbon atom in the high temperature fiber. The bonded inorganic atom may include a refractory metal covalently bound to a carbon atom. "Bonded" and "bonding" as used herein include all types of chemical bonding such as covalent and ionic bonds unless specifically limited to a specific kind of bonding.

Once the inorganic species is incorporated into the polymer precursor fiber to form the modified polymer precursor fiber, the modified polymer precursor fiber is converted to the high temperature fiber using known procedures such as pyrolysis or thermal conversion under controlled atmosphere(s), temperature(s) and time(s).

Exemplary high temperature fibers include carbon, SiC, SiBCN, SiNC, $B_4C$, SiOC, SiAlCN, HfC, ZrC, $Si_3N_4$, BN, aluminum oxide, zirconium oxide, yttrium oxide, titanium dioxide, aluminosilicate, E-glass, S-glass, and combinations thereof.

The resulting high temperature fiber having a bonded inorganic atom may be incorporated into a composite. Composites, as used herein, refer to reinforcing materials dispersed in a matrix. Exemplary matrices include polymers, metals, ceramics, glasses and combinations thereof. Exemplary ceramic and glass matrices may include: SiC, SiCO, SiCNO, SiBCN, $Si_3N_4$, carbides such as boron carbide, zirconium carbide, hafnium carbide, carbon, mixed carbide/diboride matrices, aluminum oxide, mullite, zirconium oxide, borosilicate glasses, aluminosilicate glasses, high silica glasses, phosphate glasses, and combinations thereof.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making high temperature fiber comprising incorporating an inorganic species into a polymer precursor fiber to form a modified polymer precursor fiber and converting the modified polymer precursor fiber to a high temperature fiber having a bonded inorganic atom,
   wherein the polymer precursor fiber comprises polycarbosilanes.

2. The method of claim 1, wherein the bonded inorganic atom is bound to nitrogen, oxygen, silicon, boron, or carbon.

3. The method of claim 1, wherein the inorganic atom comprises a lanthanide.

4. The method of claim 3, wherein the bonded inorganic atom comprises a refractory metal bound to carbon.

5. The method of claim 1, wherein the inorganic species is incorporated into the polymer precursor fiber by atomic layer deposition (ALD), molecular layer deposition (MLD), sequential vapor infiltration (SVI) or a combination thereof.

6. The method of claim 1, wherein the polymer precursor fiber comprises an existing inorganic atom.

7. The method of claim 6, wherein the inorganic species comprises an inorganic atom that is chemically different from the existing inorganic atom.

8. The method of claim 6, wherein the inorganic species comprises an inorganic atom that is chemically the same as the existing inorganic atom.

* * * * *